US011620730B2

(12) United States Patent
Rao et al.

(10) Patent No.: US 11,620,730 B2
(45) Date of Patent: Apr. 4, 2023

(54) METHOD FOR MERGING MULTIPLE IMAGES AND POST-PROCESSING OF PANORAMA

(71) Applicant: Realsee (Beijing) Technology Co., Ltd., Beijing (CN)

(72) Inventors: Tong Rao, Beijing (CN); Cihui Pan, Beijing (CN); Mingyuan Wang, Beijing (CN); Xiaodong Gu, Beijing (CN); Chenglin Liu, Beijing (CN)

(73) Assignee: Realsee (Beijing) Technology Co., Ltd., Beijing (CN)

( * ) Notice: Subject to any disclaimer, the term of this patent is extended or adjusted under 35 U.S.C. 154(b) by 69 days.

(21) Appl. No.: 17/210,100

(22) Filed: Mar. 23, 2021

(65) Prior Publication Data

US 2021/0295467 A1    Sep. 23, 2021

(30) Foreign Application Priority Data

Mar. 23, 2020   (CN) .......................... 202010205822.9
Mar. 27, 2020   (CN) .......................... 202010228323.1
Mar. 27, 2020   (CN) .......................... 202010231059.7

(51) Int. Cl.
*G06T 7/00*   (2017.01)
*G06T 3/40*   (2006.01)
(Continued)

(52) U.S. Cl.
CPC ............ *G06T 3/4038* (2013.01); *G06T 5/001* (2013.01); *G06T 5/50* (2013.01); *G06T 7/11* (2017.01);
(Continued)

(58) Field of Classification Search
CPC ......... G06T 3/4038; G06T 2207/20221; G06T 7/33; G06T 2200/32; G06T 2207/20081;
(Continued)

(56) References Cited

U.S. PATENT DOCUMENTS

2010/0021065 A1*  1/2010  Sibiryakov .............. G06T 7/35
                                                         382/190
2016/0014396 A1*  1/2016  Glinec .................... A61B 1/24
                                                          433/29
(Continued)

FOREIGN PATENT DOCUMENTS

CN   201510609612.5    3/2016
CN   201610608914.5    1/2017
(Continued)

OTHER PUBLICATIONS

First Office Action issued in Chinese application 202010231059.7.
(Continued)

*Primary Examiner* — Li Liu
(74) *Attorney, Agent, or Firm* — Leydig, Voit & Mayer, Ltd.

(57) ABSTRACT

A method for combining multiple images is disclosed herein. A target mapping matrix is determined based on a first image and a second image. The target mapping matrix is associated with a target correspondence between the first image and the second image. The first image and the second image are combined into a combined image based on the first target mapping matrix. The combined image is output by implementing the disclosed method.

20 Claims, 13 Drawing Sheets

(51) Int. Cl.
  *G06T 7/70* (2017.01)
  *G06T 7/11* (2017.01)
  *G06T 7/13* (2017.01)
  *G06T 5/00* (2006.01)
  *G06T 5/50* (2006.01)
  *G06T 7/174* (2017.01)

(52) U.S. Cl.
  CPC ............... *G06T 7/13* (2017.01); *G06T 7/174* (2017.01); *G06T 7/70* (2017.01); *G06T 2207/20081* (2013.01); *G06T 2207/20084* (2013.01); *G06T 2207/20212* (2013.01)

(58) Field of Classification Search
  CPC  G06T 2207/20084; G06T 2207/20212; G06K 9/6201; G06K 9/6256; G06K 9/6218; G06V 10/462; G06V 10/757; G06V 10/16; G06V 10/44; G06V 10/774; G06V 10/7715; G06V 10/82; G06N 3/08
  See application file for complete search history.

(56) References Cited

U.S. PATENT DOCUMENTS

2016/0307350 A1* 10/2016 Huang ................... G06V 10/44
2017/0019594 A1*  1/2017 Wu ........................ G06T 3/4038
2019/0294924 A1*  9/2019 Gould ................... G06K 9/6256
2020/0279354 A1*  9/2020 Klaiman ................. G06N 3/04

FOREIGN PATENT DOCUMENTS

CN  201611159508.1  3/2017
CN  201710418404.6  12/2018
CN  201810832419.1  12/2018

OTHER PUBLICATIONS

First Office Action issued in Chinese application 202010228323.1.

* cited by examiner

METHOD FOR MERGING MULTIPLE IMAGES AND POST-PROCESSING OF PANORAMA

CLAIM OF PRIORITY

This application claims the benefits of priorities to Chinese Patent Application No. 202010231059.7, filed Mar. 27, 2020, Chinese Patent Application No. 202010228323.1, filed Mar. 27, 2020, and Chinese Patent Application No. 202010205822.9, filed Mar. 23, 2020, the entire contents of which are incorporated herein by reference.

TECHNICAL FIELD

The present disclosure relates to the field of virtual reality technology and, more specifically, to image processing for generating virtual reality data.

BACKGROUND

Three-dimensional (3D) virtual reality (VR) environment provides a simulated experience that is useful in various applications, such as virtual house touring, virtual map, or interior decoration. The 3D VR scene may be generated based on a plurality of images acquired by an imaging device, such as a smartphone or a digital camera. For instance, a user may hold a smartphone and rotate 360 degrees to acquire a plurality of images of a scene.

Feature-based panoramic stitching approaches may be used to combine the plurality of images of the scene in order to generate a panorama. In the splicing process, it is necessary to extract distinct features for each image. As such, a correspondence between a pair of adjacent images may be established by matching the distinct features of the images. A mapping matrix between the images may be calculated to represent the correspondence between the images. Based on the resulting correspondences among the plurality of images, a panorama may be generated for the scene.

However, the foregoing process relies on the number of features extracted from the images and the accuracy of feature matching process between images to provide high-quality results. Establishment of the correspondence between the images may be challenged, when at least one of the following situations occurs: (1) very few features detected in an image, (2) highly concentrated features in a local area of an image, and (3) low matching rate of the extracted features between images.

Thus, there is a need for providing robust imaging combination for use, among other applications, in virtual reality applications.

SUMMARY

A method, computer readable medium, system and apparatus are disclosed for combining multiple images. A robust correspondence between adjacent images may be determined. Such that a high-quality composite image may be generated by combining the adjacent images based on the robust correspondences.

In some embodiments, a method is provided for combining multiple images. The method comprises determining a first target mapping matrix based on a first image and a second image, combining the first image and the second image into a combined image based on the first target mapping matrix and outputting the combined image. The first target mapping matrix is associated with a target correspondence between the first image and the second image.

In some embodiments, the method further comprises determining an initial mapping matrix based on matching features between the first image and the second image and determining the first target mapping matrix based on an overlapping portion between the first image and the second image. The initial mapping matrix is associated with an initial correspondence between the first image and the second image. The overlapping portion is determined based on the first image, the second image, and the initial mapping matrix.

In some embodiments, the method further comprises determining a first set of feature points in the first image and determining a second set of feature points in the second image. Each feature point of a subset of the second set of feature points corresponding to one of the first set of feature points. Determining the initial mapping matrix is further based on the feature points of the subset of the second set of feature points and the corresponding feature points in the first set of feature points.

In some embodiments, the method further comprises determining a descriptor for each feature point of the first set of feature points and for each feature point of the second set of feature points, calculating a plurality of first distances, and selecting matching pairs from the first set of feature points and the second set of feature points based on the plurality of first distances. Each of the plurality of first distances corresponds to a distance between the descriptor of each of the first set of feature points and the descriptor of each of the second set of feature points. Furthermore, each of the matching pairs includes a first feature point selected from the first set of feature points and a second feature point selected from the second set of feature points corresponding to the first feature point. Determining the initial mapping matrix is further based on the matching pairs.

In some embodiments, the first distance between the descriptor of the first feature point and the descriptor of the second feature point is less than 128 pixels.

In some embodiments, the method further comprises mapping the first image to an image space of the second image based on the initial mapping matrix, determining a region of interest (ROI) based on the overlapping potion of the mapped first image and the second image, determining a first set of corner points in the ROI of the first image, and determining a second set of corner points in the second image based on the first set of corner points in the first image. Each corner point in the second set of the corner points corresponds to a corner point in the first set of the corner points.

In some embodiments, determining the first target mapping matrix is further based on the first set of corner points and the second set of corner points.

In some embodiments, the method further comprises determining a third set of corner points in the first image based on the second set of corner points in the second image. Each corner point in the third second set of corner points corresponds to a corner point in the second set of corner points and corresponds to a corner point in the first set of corner points.

In some embodiments, the method further comprises calculating a plurality of second distances, and selecting a fourth set of corner points from the first set of corner points in the first image based on the plurality of second distances. Each of the plurality of second distances corresponds to a distance between the corner point of the first set of corner points and the corresponding corner point of the third set of corner points. Furthermore, the second distance between each corner point of the fourth set of corner points and the corresponding corner point of the first set of corner points is less than a threshold. Determining the first target mapping matrix is further based on the fourth set of corner points and the second set of corner points.

In some embodiments, the method further comprises capturing the first image and the second image using an imaging device, determining a first parameter matrix of the imaging device corresponding to the first image, determining a second parameter matrix of the imaging device corresponding to the second image, determining a first rotational matrix between the first image and the second image based on the first parameter matrix and the second parameter matrix, determining a first intrinsic matrix of the imaging device corresponding to the first image, and determining a second intrinsic matrix of the imaging device corresponding to the second image. The imaging device is used to capture the multiple images, and the multiple images comprise the first image and the second image. Determining the first target mapping matrix is further based on the first intrinsic matrix, the second intrinsic matrix and the first rotational matrix.

In some embodiments, the multiple images further comprise a third image and a fourth image. The method further comprises determining a second target mapping matrix based on the third image and the first image, determining a second rotational matrix between the first image and the third image, determining a third target mapping matrix based on the second image and the fourth image, and determining a third rotational matrix between the second image and the fourth image. Determining the first intrinsic matrix of the imaging device corresponding to the first image is further based on the second target mapping matrix and the second rotational matrix. Determining the second intrinsic matrix of the imaging device corresponding to the second image is further based on the third target mapping matrix and the third rotational matrix.

In some embodiments, at least one of the intrinsic matrices is determined based on an effective focal length of the imaging device.

In some embodiments, each of the parameter matrices of the imaging device comprises a rotation matrix and a translation vector, indicating rotation and displacement information of the imaging device for a corresponding image.

In some embodiments, the combined image of the first image and the second image comprises a ghost image, and the ghost image is a defect within the combined image. The method further comprises eliminating the ghost image from the combined image based on applying a neural network to the combined image.

In some embodiments, the method further comprises generating a plurality of training sets, each training set comprising a first training image and a second training image and training the neural network by using the plurality of training sets. The second training image comprises a copy of the first training image imparted with at least one ghost image.

In some embodiments, the first training image in each training set is a panorama. The method further comprises projecting the first training image to a spherical surface corresponding to the panorama, determining a first region on the spherical surface, determining a second region on the spherical surface, determining a third region by applying a random disturbance to the location of the second region, obtaining an image of the third region in the first training image, and generating the second training image by imparting the image of the third region to the second region of the first training image. The size of the first region is the same as the size of an image acquired by the imaging device, and the second region is of the same size as the first region. Additionally, the second region and the first region have an overlapping portion. Furthermore, the portion of the image of the third region at the overlapping portion is made transparent before the imparting.

In some embodiments, the random disturbance is applied according to a normal distribution.

In some embodiments, an output of the neural network comprises an indication mask indicating a position of each ghost image for the second training image.

In some embodiments, a non-transitory computer-readable medium is provided. The non-transitory computer-readable medium has computer-executable instructions stored thereon, which, when executed by one or more processor, cause a processor to facilitate determining a first target mapping matrix based on a first image and a second image, combining the first image and the second image into a combined image based on the first target mapping matrix, and outputting the combined image. The first target mapping matrix associated with a target correspondence between the first image and the second image.

In some embodiments, a device for combining multiple images is provided. The device comprises one or more processors and a non-transitory computer-readable medium. The non-transitory computer-readable medium has computer-executable instructions stored thereon, which, when executed by one or more processor, cause a processor to facilitate determining a first target mapping matrix based on a first image and a second image, combining the first image and the second image into a combined image based on the first target mapping matrix, and outputting the combined image. The first target mapping matrix associated with a target correspondence between the first image and the second image.

DETAILED DESCRIPTION

The present disclosure described herein provides solutions for combining multiple images. A robust correspondence between adjacent images may be determined, in order to generate a high-quality composite by combining the adjacent images. Such solutions may be applied to a plurality of images acquired by an imaging device for a three-dimensional (3D) space. As such, a high-quality panorama may be generated by combining the plurality of images based on the obtained robust correspondences.

In some embodiments, a robust correspondence between adjacent images may be determined by matching features in overlapping fields of view of the adjacent images. In such embodiments, the overlapping fields of view of the adjacent images may be determined by an initial correspondence between the adjacent images. Thereafter features in the overlapping fields of view of the adjacent images may be further analyzed to adjust the initial correspondence. As such, a robust correspondence may be established between adjacent images. Ideally, the more matching features identified between adjacent images, the more robust the established correspondence will be. However, identifying matching features may be challenging when the images lack of distinct features, have highly localized features or the matching rate is low. The solutions provided herein may solve the issues by establishing correspondence between corner points of the adjacent images by applying optical flow algorithm.

In some embodiments, the correspondence between adjacent images may be determined by implementing parameters output from an imaging device. Each image acquired by the imaging device may be associated with a set of parameters of the imaging device, such as rotation matrix and translation vector, which may indicate position information of the imaging device while acquiring the image. A robust correspondence between adjacent images may be calculated by implementing such parameters. Such that, correspondences between adjacent images may be determined in order to combine the multiple images.

The combined image may include at least one ghost image. As will be further disclosed hereinafter, a neural network may be trained to remove the at least one ghost image to further improve the quality of the combined image.

By applying the solutions provided herein, a plurality of images may be combined to generate a panorama of a scene. Further, the generated panorama may be optimized by applying a trained neural network. So that, a high-quality panorama of the scene may be generated to provide for simulated VR applications for a 3D space.

Figure 1:
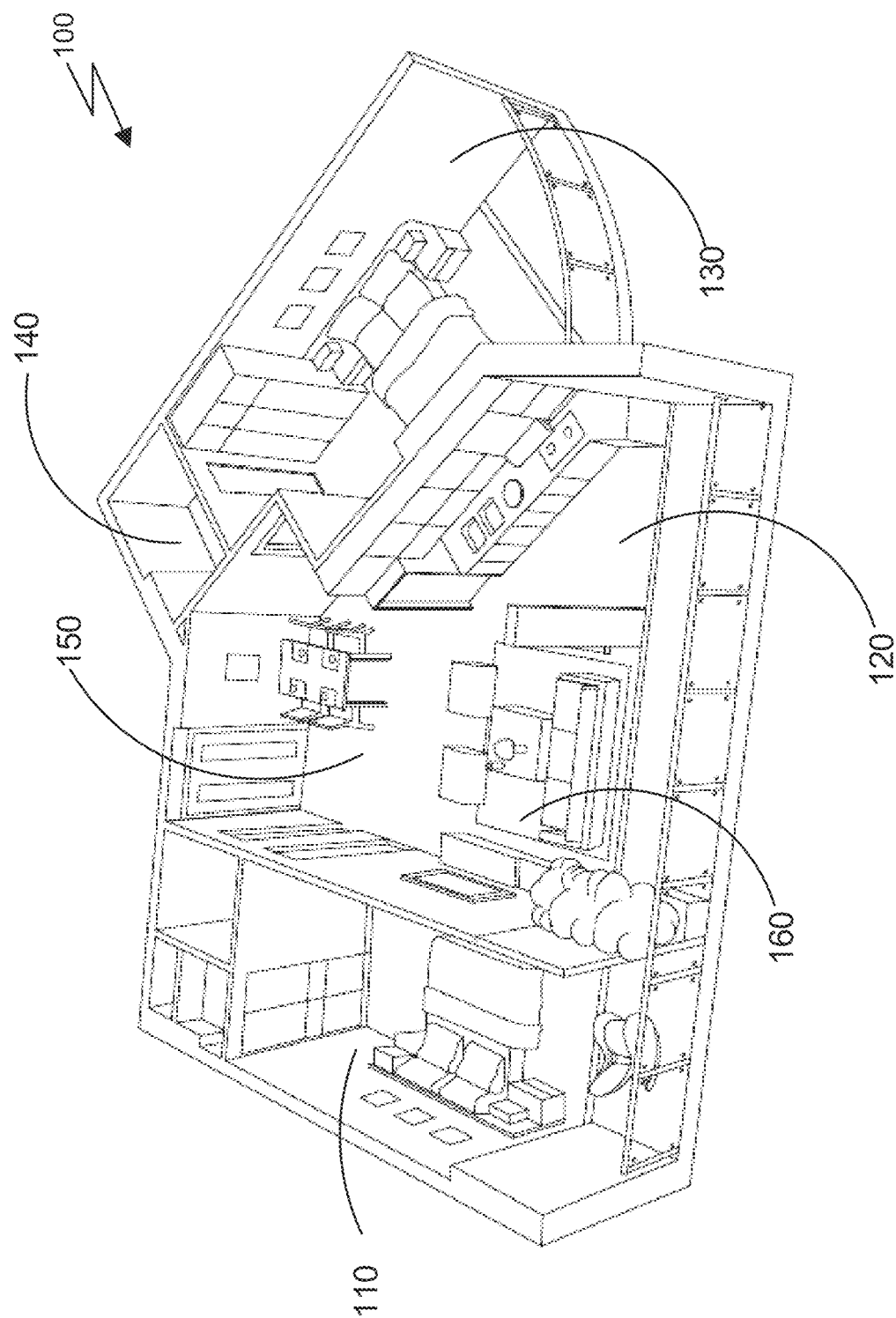
FIG. 1 illustrates an exemplary three-dimensional (3D) virtual reality (VR) environment in accordance with an embodiment.

FIG. 1 illustrates an exemplary 3D VR environment 100, in accordance with some embodiments. As shown in FIG. 1, 3D VR environment 100 may simulate or represent a residential unit, such as an apartment or house floor. It is noted that 3D VR environment 100 may include a VR representation of any in-door space or environment. Referring to FIG. 1, 3D VR environment 100 may include one or more functional spaces, such as 110, 120, 130, 140, 150, and 160. As used herein, a functional space refers to an enclosed or partially enclosed space that is associated with a particular function. In some cases, a functional space may correspond to a room. For example, functional space 110 may correspond to a first bedroom, and functional space 130 may correspond to a second bedroom. In some cases, a functional space may correspond to an enclosed or partially enclosed space within or adjacent to a room. For example, functional space 140 may correspond to a closet. In some cases, a function space may correspond to an area that is generally used for a specific purpose. For example, functional space 120 may correspond to a kitchen area, functional space 150 may correspond to a dining area, and functional space 160 may correspond to a living room. Although functional spaces 120, 150, and 160 may share the same room (e.g., an enclosed area), they may be considered as different functional spaces due to their different functions.

Figure 2:
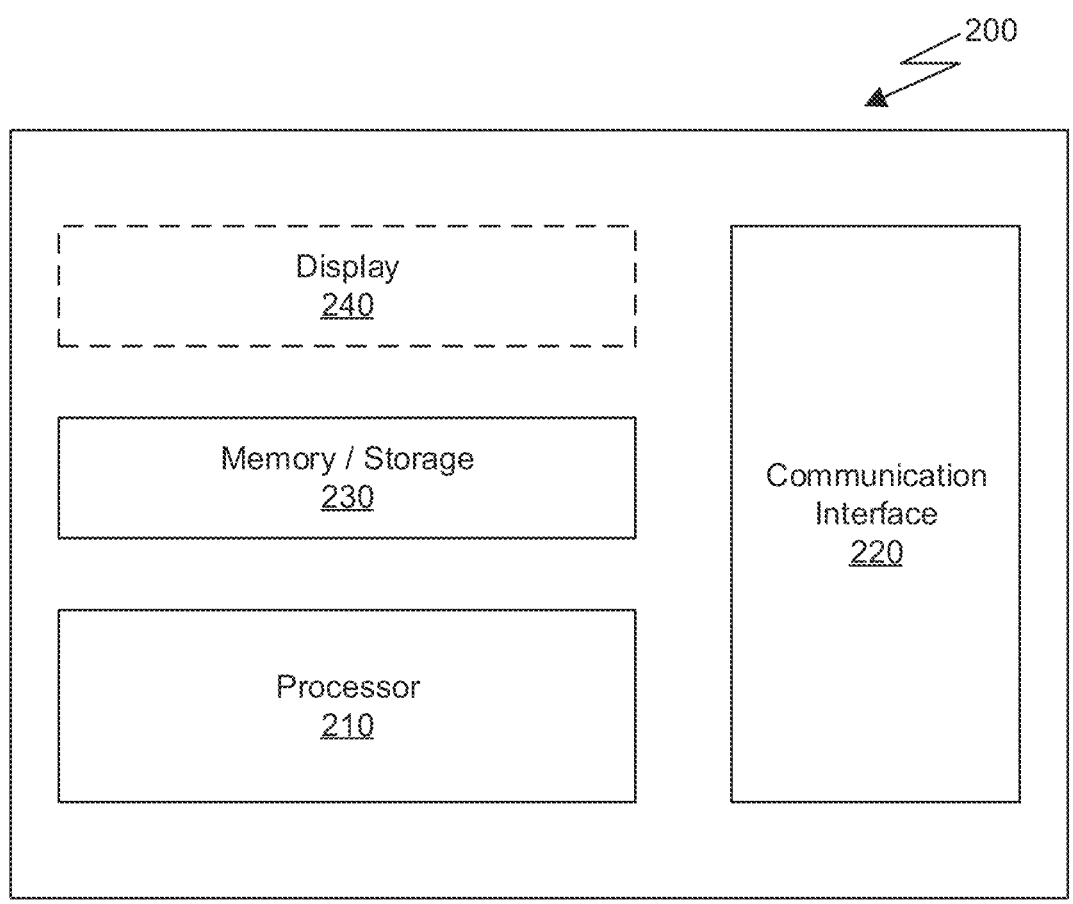
FIG. 2 illustrates a block diagram of an exemplary computer system in accordance with an embodiment.

FIG. 2 illustrates a block diagram of an exemplary computer system 200 configured to implement various functions disclosed herein. For example, computer system 200 may be configured as a server to create or reconstruct VR environment 100. In another example, computer system 200 may be configured as terminal device to display or enrich VR environment 100. As shown in FIG. 2, computer system 200 may include a processor 210, a communication interface 220, a memory/storage 230, and a display 240. Memory/storage 230 may be configured to store computer-readable instructions that, when executed by processor 210, can cause processor 210 to perform various operations disclosed herein. Memory 230 may be any non-transitory type of mass storage, such as volatile or non-volatile, magnetic, semiconductor-based, tape-based, optical, removable, non-removable, or other type of storage device or tangible computer-readable medium including, but not limited to, a ROM, a flash memory, a dynamic RAM, and a static RAM.

Processor 210 may be configured to perform the operations in accordance with the instructions stored in memory 230. Processor 210 may include any appropriate type of general-purpose or special-purpose microprocessor, digital signal processor, microcontroller, or the like. Processor 210 may be configured as a separate processor module dedicated to performing one or more specific operations disclosed herein. Alternatively, processor 210 may be configured as a shared processor module for capable of performing other operations unrelated to the one or more specific operations disclosed herein.

Communication interface 220 may be configured to communicate information between computer system 200 and other devices or systems. For example, communication interface 220 may include an integrated services digital network (ISDN) card, a cable modem, a satellite modem, or a modem to provide a data communication connection. As another example, communication interface 220 may include a local area network (LAN) card to provide a data communication connection to a compatible LAN. As a further example, communication interface 220 may include a high-speed network adapter such as a fiber optic network adaptor, 10G Ethernet adaptor, or the like. Wireless links can also be implemented by communication interface 220. In such an implementation, communication interface 220 can send and receive electrical, electromagnetic or optical signals that carry digital data streams representing various types of information via a network. The network can typically include a cellular communication network, a Wireless Local Area Network (WLAN), a Wide Area Network (WAN), or the like.

Communication interface 220 may also include various I/O devices such as a keyboard, a mouse, a touchpad, a touch screen, a microphone, a camera, a biosensor, etc. A user may input data to terminal a device through communication interface 220.

Display 240 may be integrated as part of computer system 200 or may be provided as a separate device communicatively coupled to computer system 200. Display 240 may include a display device such as a Liquid Crystal Display (LCD), a Light Emitting Diode Display (LED), a plasma display, or any other type of display, and provide a Graphical User Interface (GUI) presented on the display for user input and data depiction. In some embodiments, display device 240 may include a VR goggle, a pair of VR glasses, or other similar devices that provide immersive VR experience. For example, VR environment 100 may be displayed on display 240. In some embodiments, display 240 may be integrated as part of communication interface 220.

Figure 3A:
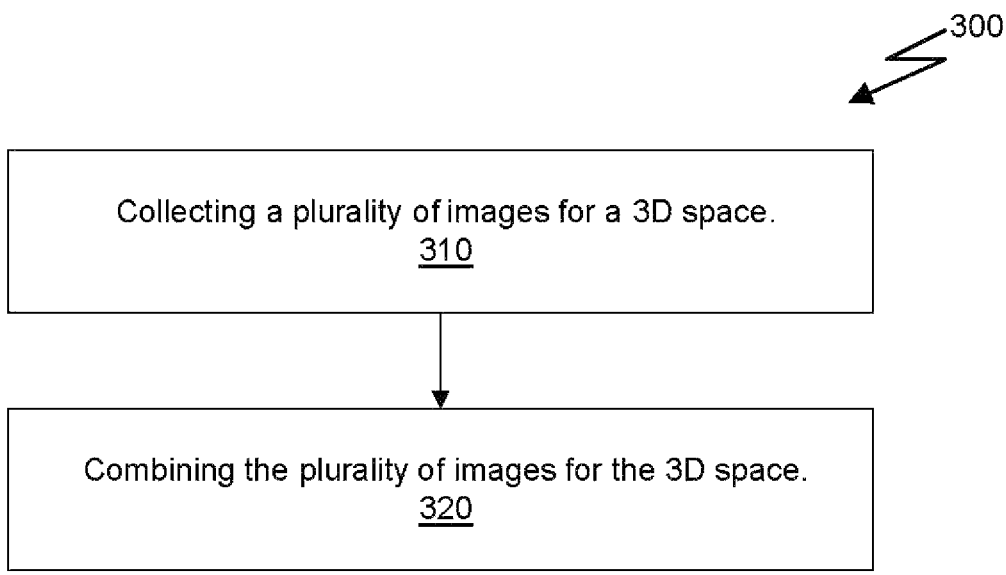
FIG. 3A illustrates a process for generating a panorama based on a plurality of images acquired for a 3D space in accordance with an embodiment.

FIG. 3A illustrates a process 300 for generating a panorama based on a plurality of images acquired for a 3D space in accordance with an embodiment. Process 300 may be implemented by device 200 according to the computer-executable instructions stored in memory 230. Of course, it will be appreciated that any system or device capable of carrying out the steps of process 300 is contemplated as being within the scope of the present disclosure.

At step 310, a plurality of images for a 3D space may be collected.

The plurality of images may be acquired by an imaging device. The imaging device may be an electronic device with a camera module, such as a smartphone, a tablet, and a laptop. Alternatively, the imaging device may be a camera connected with an electronic device, such as a digital camera communicating with a computer or other mobile devices through a wired or wireless connection. The plurality of images may be acquired in such a way that adjacent images may have overlapping fields of view, which is an overlapping portion between two adjacent images. Such overlapping portion of the adjacent images may be defined as a region of interest (ROI), in which features may be detected, tracked and/or matched. So that robust correspondences between adjacent images may be determined.

Additionally, the imaging device may have one or more augmented reality (AR) applications stored thereon. The AR application may provide an Application Programming Interface (API) to render a virtual 3D space of the scene. In an embodiment, the AR application may be developed or deployed based on platforms known in the art, such as ARKIT in an iPhone operation system (iOS) or ARCORE in an ANDROID system. On an AR platform, an AR experience may be controlled by using an object available on the AR platform, such as an ARSession object of ARKIT in iOS. The ARSession object coordinates processes including reading data from a device's motion sensor, controlling the device's built-in camera, and performing image analysis on captured camera images. As such, by tracking changes corresponding to movements of the imaging device using the ARSession object, the imaging device may obtain a parameter matrix and determine the position and the orientation of the imaging device. The parameter matrix may be a 4×4 matrix output from the motion sensor, which may include a 3×3 rotation matrix and a translation vector as known in the art. The parameters output from the imaging device may be associated with each image acquired by the imaging device. Correspondences between images may be calculated by implementing such parameters from the imaging device.

At step 320, the plurality of images may be combined to generate a panorama of the 3D space. The combination process may be conducted based on the correspondences determined for adjacent images.

In some embodiments, the correspondence between adjacent images may be determined by matching features in the overlapping portions of the adjacent images. An overlapping portion of the adjacent images may be determined based on an initial correspondence, which may be quantized as an initial mapping matrix. The overlapping portion of adjacent images may be defined as a region of interest (ROI), in which features may be detected, tracked and/or matched. For instance, a number of feature points may be extracted to track edges, corners, objects, gradients, and other features in the ROI of the adjacent images. By analyzing the feature points in the ROI of the adjacent images, the initial mapping matrix may be fine-tuned, thus obtaining a more robust target mapping matrix. As such, a high-quality panorama may be generated by combining the plurality of images based on the obtained target mapping matrices.

In some embodiments, the adjacent images may not contain sufficient features to generate a robust correspondence. In such embodiments, parameters output from an imaging device may be implemented for calculation of the correspondence. The parameters of the imaging device may include rotation matrix and translation vector that indicate position information of the imaging device while acquiring a corresponding image. Such parameters may be utilized to calculate correspondences between adjacent images to combine the adjacent images.

Figure 3B:
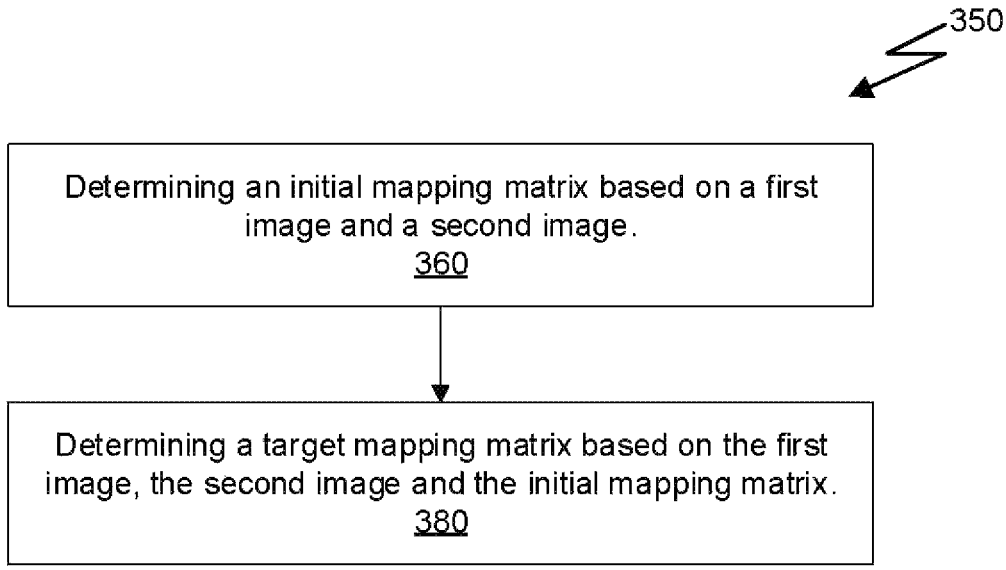
FIG. 3B illustrates a process of determining a correspondence between two images.

FIG. 3B illustrates a process 350 of determining correspondence between two images for implementing process 300 of FIG. 3A. The correspondence between the two images may be quantified as a mapping matrix in accordance with some embodiments. An initial mapping matrix may represent an initial correspondence between the two images. The initial correspondence may be fine-tuned to obtain a robust correspondence between the two images, thus ensuring high-quality of the image combination. The fine-tuned correspondence may be represented by a target mapping matrix. Process 350 may also be implemented by device 200 according to the computer-executable instructions stored in memory 230. Of course, it will be appreciated that any system or device capable of carrying out the steps of process 350 is contemplated as being within the scope of the present disclosure.

At step 360, an initial mapping matrix may be determined based on a first image and a second image. The first image and the second image may have an overlapping portion. The initial mapping matrix may represent an initial correspondence between the first image and the second image. The initial mapping matrix may be determined by correlating common features of the first and second images. Such features may include but not limited to edges, corners, objects and gradients. Known feature detection algorithms, such as scale-invariant feature transform (SIFT), oriented features from accelerated segment test and rotated binary robust independent elementary features (ORB), speeded up robust features (SURF) and binary robust invariant scalable keypoints (BRISK), may be applied in this step.

In one embodiment, a first set of feature points may be extracted from the first image to represent features of the first image. Similarly, a second set of feature points may be extracted from the second image to represent features of the second image. The first set of feature points may be compared with the second set of feature points to obtain a subset of matching feature point pairs. Each pair of matching feature points includes one feature point of the first set of feature points and a corresponding feature point of the second set of feature points. The initial mapping matrix may be determined based on the correspondence between feature points of each pair of matching feature points. It will be appreciated that the feature points described herein are not limited in this disclosure, any feature detectors such as corner points and feature vectors may be utilized as feature points for feature detection.

Further, each feature point of the first set of feature points and the second set of feature points may be associated with a descriptor. The descriptor may comprise a binary string that is calculated from a number of randomly selected point pairs near the associated feature point. A point pair may include a pair of points with close proximity. The binary string may be constituted by grayscale values calculated from each point pair of the number of randomly selected point pairs. As such, a feature point of the first set of feature points and a feature point of the second set of feature points may be compared by comparing descriptors associated with the feature points of the first set of feature points and the second set of feature points, respectively. In some embodiments, two descriptors each carries a binary string may be compared by Hamming distance, that is a metric for comparing two binary data strings well known in the art. As known in the art, a pair of mismatching feature points typically have a Hamming distance of 128 pixels. A pair of matching feature points may have a Hamming distance smaller than 128 pixels. A suitable threshold may be defined for the Hamming distance of matching feature points. So that pairs of matching feature points between the first image and the second image may be determined by applying such distance comparing approach.

Alternatively, corner points may be applied for feature detection and comparison. Corner points may represent corners in images. As an example, a corner may be defined as intersection of two edges. Known algorithms for corner detection by using corner points include Harris & Stephens corner detection algorithm, Shi-Tomasi corner detection algorithm, etc. Since corner points do not require calculations of descriptors, extraction of the corner points may be faster than extraction of other feature points associated with descriptors, thus a mapping matrix obtained by matching corner points can be verified faster.

In some embodiments, the first image and second image may be combined based on the initial mapping matrix. Quality of the combined image may depend on various factors, such as the number of the matching feature point pairs, the distribution of the matching feature point pairs, and/or the amount of overlapping portion of the first and second images. Theoretically, the larger the number of matching feature point pairs are, the more evenly the matching feature point pairs are distributed, and the larger the overlapping portion of the first image and the second image is, the better the quality of the combined image will be. However, such high-quality result may pose strict requirements for image collection process and drastically increase computational cost. To address this drawback, the initial mapping matrix may be used as an initial correspondence between the first and second images. Based on the initial correspondence, an overlapping portion of the first and second image may be estimated. Such overlapping portion is typically a subset of the first and second images, and contains all the common features of the first and the second images. Therefore, analyzing the overlapping portion of the first and second images rather than the first and second images entirely may reduce the computational cost significantly. That said, more computational costly processes may be applied to the overlapping portion of the first and second images, so that a fine-tuned target mapping matrix may be obtained thus ensuring high-quality of the combined image.

At step 380, a target mapping matrix may be determined based on the first image, the second image and the initial mapping matrix. Embodiments of implementing step 380 of process 350 in FIG. 3B will be described as follows.

Figure 4:
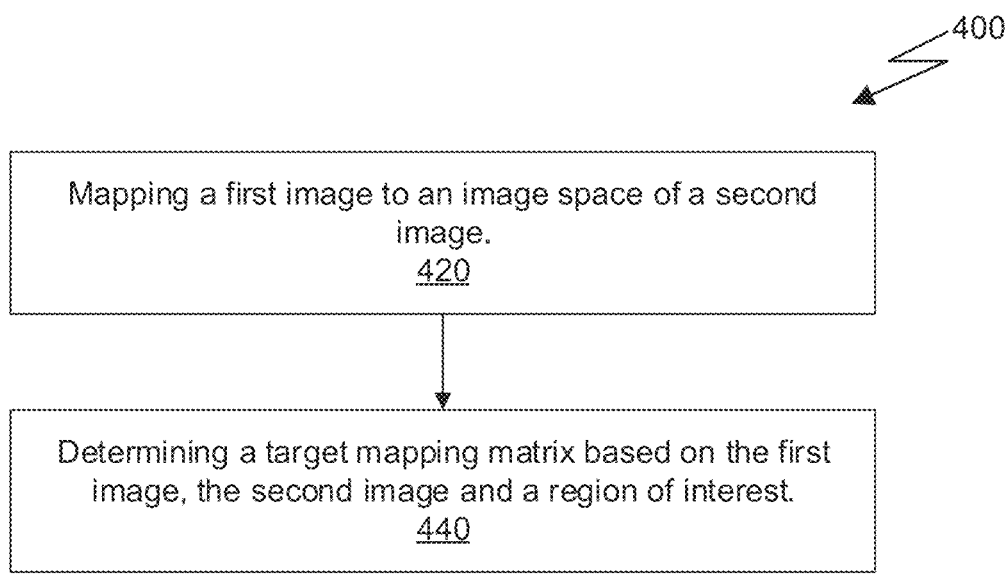
FIG. 4 illustrates a process of determining a target mapping matrix in accordance with an embodiment.

FIG. 4 illustrates a process 400 of determining the target mapping matrix in accordance with an embodiment. Process 400 may also be implemented by device 200 according to the computer-executable instructions stored in memory 230. Of course, it will be appreciated that any system or device capable of carrying out the steps of process 400 is contemplated as being within the scope of the present disclosure.

At step 420, the first image may be mapped to an image space of the second image based on the initial mapping matrix. The first and second images may have overlapping fields of view, that results in an overlapping portion between the mapped first image and the second image in the image space of the second image. Such mapping may be a homography mapping that relates to two images of the same planar surface in space. In other words, the mapped first image may be a projection of the first image in the image space of the second image. So that the overlapping portion between the first image and the second image may be projected as an overlapping portion between the mapped first image and the second image in the image space of the second image. The projected overlapping portion may be defined as a ROI.

In a further embodiment, pixels of the first image may be mapped to the image space of the second image based on the initial mapping matrix. Such that each pixel of the mapped first image in the image space of the second image corresponds to one pixel of the first image in the original image space of the first image. However, the obtained pixels by such mapping calculation may not be integers, thus resulting in voids in displaying the mapped image, since pixels of an image have to be integers. Therefore, the calculated pixels for the mapped first image may be approximated by applying resampling techniques in the art, such as bilinear interpolation technique. So that each of the obtained pixels of the mapped first image may be rounded to an integer. In this way, the mapped first image may be displayed in the image space of the second image without decimal pixels that are unable to be displayed.

At step 440, the target mapping matrix may be determined based on the first image, the second image and the ROI.

Figure 5A:
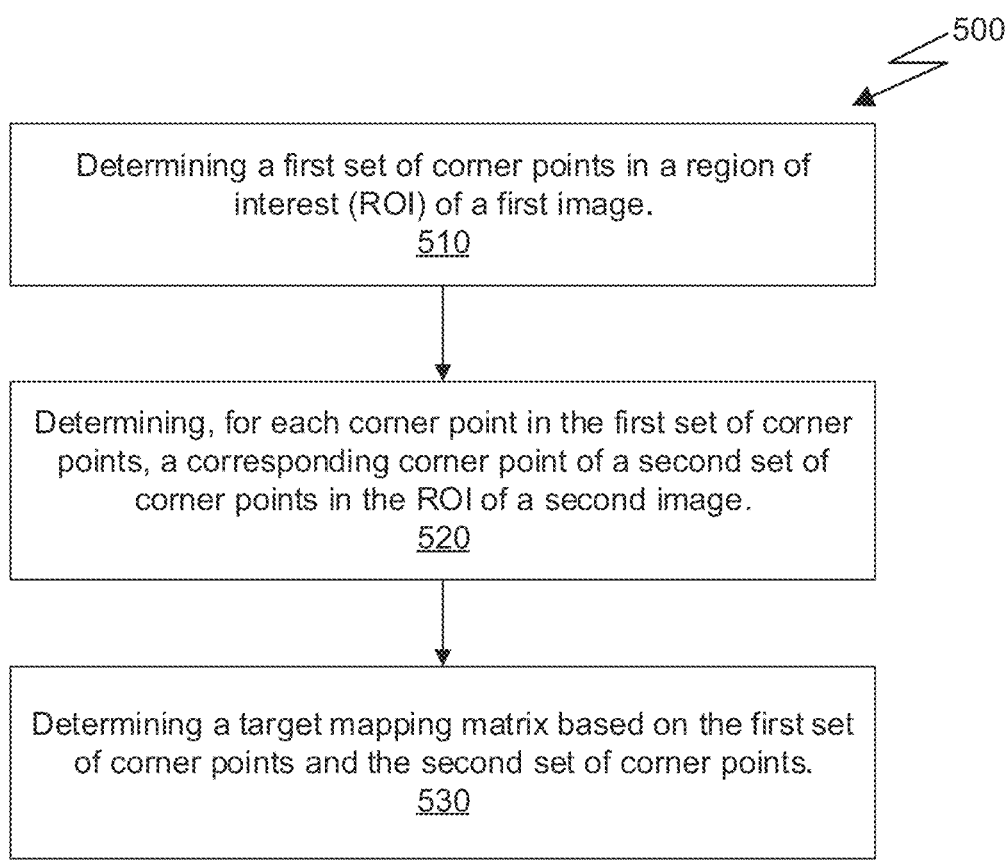
FIG. 5A illustrates a process of utilizing corner points in a region of interest (ROI).

FIG. 5A illustrates a process 500 of utilizing corner points in the ROI in accordance with an embodiment. Process 500 may also be implemented by device 200 according to the computer-executable instructions stored in memory 230. Of course, it will be appreciated that any system or device capable of carrying out the steps of process 500 is contemplated as being within the scope of the present disclosure.

At step 510, a first set of corner points may be determined in the ROI of the first image. Since corner points do not require calculations of descriptors, extraction of the corner points may be faster than extraction of other feature points associated with descriptors. Additionally, extraction process of the corner points depends solely on gradient of an image, so that the extracted corner points may spread the entire image space, rather than concentrated in areas with rich textures.

At step 520, for each corner point in the first set of corner points, a corresponding corner point of a second set of corner points in the ROI of the second image may be determined. The second set of corner points may be determined by tracking movement of the corner points from the first image to the second image. Various techniques may be used to track displacement of objects in a sequence of images. For instance, optical flow technique is widely used for tracking motions, objects, edges and other features for machine vision applications. In this embodiment, the optical flow technique may be applied to track the projected first set of corner points in the ROI in the image space of the second image. Such that, each corner point of the first set of corner points of the first image may be matched to a corner point of the second set of corner points of the second image based on a correspondence determined by the optical flow technique.

At step 530, the target mapping matrix may be determined based on the first set of corner points and the second set of corner points. Each one of the first set of corner points of the first image may be matched to a corresponding corner point of the second set of corner points of the second image thus forming a matching corner point pair. The target mapping matrix may be determined from the resulting corner point pairs based on the first and second set of corner points.

Figure 5B:
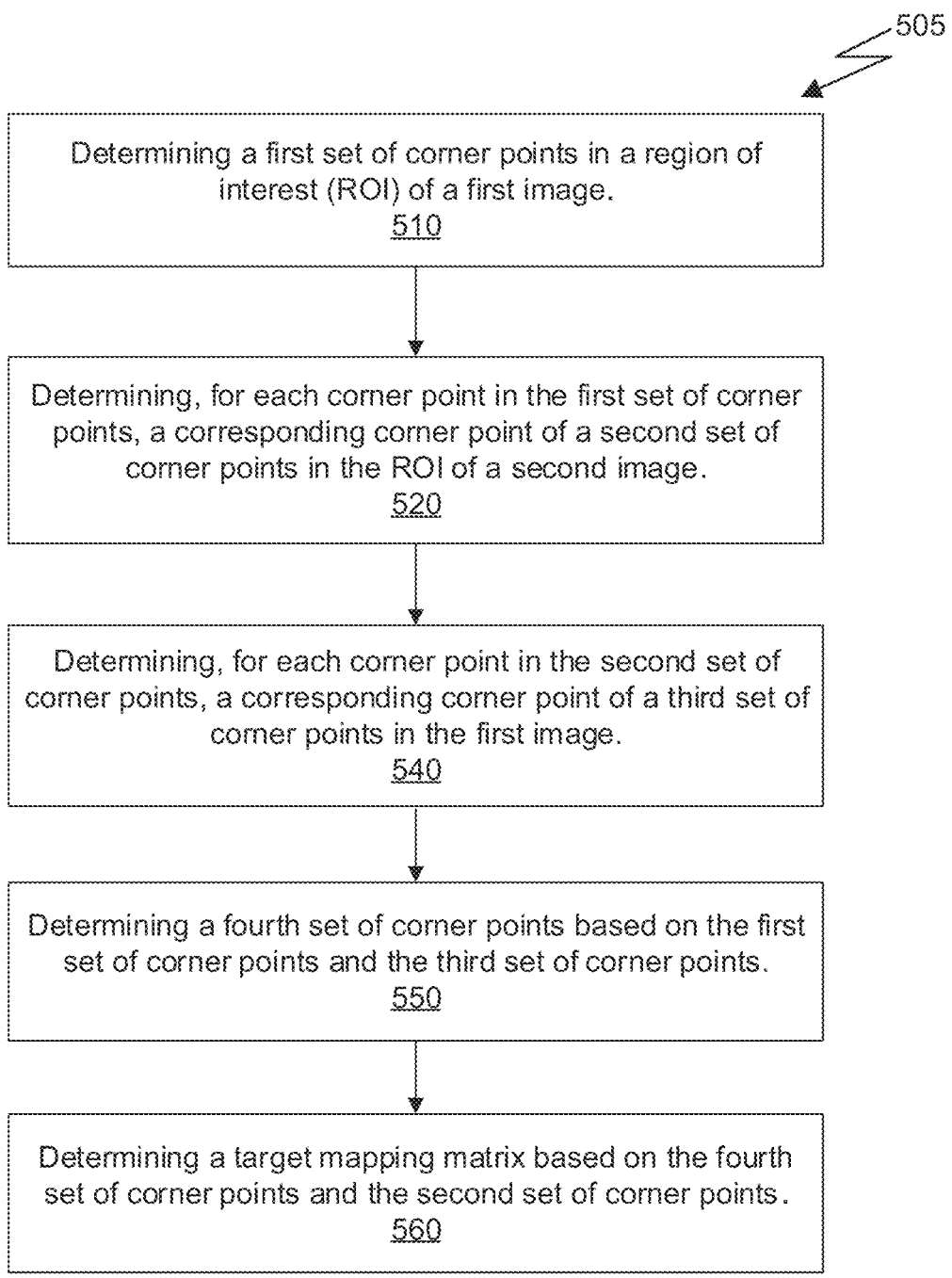
FIG. 5B illustrates a process in accordance with a further embodiment.

FIG. 5B illustrates a process 505 in accordance with a further embodiment of process 500. Process 505 may also be implemented by device 200 according to the computer-executable instructions stored in memory 230. Of course, it will be appreciated that any system or device capable of carrying out the steps of process 505 is contemplated as being within the scope of the present disclosure.

At step 510, a first set of corner points may be determined in the ROI of the first image.

At step 520, for each corner point in the first set of corner points, a corresponding corner point of a second set of corner points in the ROI of the second image may be determined.

At step 540, for each corner point in the second set of corner points, a corresponding corner point of a third set of corner points in the ROI of the first image may be determined. Similarly, optical flow technique may be applied to track the second set of corner points in the ROI in an image space of the first image. Such that, each corner point of the second set of corner points of the second image may be matched to a corner point of the third set of corner points of the first image based on a correspondence determined by the optical flow technique. As a result, the first set of corner points and the third set of corner points are both in the first image.

At step 550, a fourth set of corner points may be determined based on the first set of corner points and the third set of corner points. Each corner point of the third set of corner points corresponds to a corner point of the first set of corner points, thus forming a corner point pair. The distance between corner points of a corner point pair may be compare to a predefined threshold. Such that the corner point pair with a distance below the threshold may be a matching corner pair. On the other hand, the corner point pair with a distance above the threshold may be a mismatching corner point pair. Each of the corner points of the first set of corner points that belongs to a matching corner point pair may be added to a fourth set of corner points in the first image.

Optionally, a descriptor of each corner point of the first set of corner points and the third set of corner points may be calculated and expressed as a binary string. Such that a Hamming distance between the corner points of the corner point pair may be compared.

At step 560, the target mapping matrix may be determined based on the fourth set of corner points and the second set of corner points. Each one of the fourth set of corner points of the first image may be matched to a corresponding corner point of the second set of corner points of the second image thus forming a matching corner point pair. The target mapping matrix may be determined from the resulting corner point pairs based on the fourth set of corner points and the second set of corner points.

The foregoing embodiments provide solutions for obtaining a fine-tuned correspondence between adjacent images, under the condition that the adjacent images have sufficient common features in the overlapping fields of view of the adjacent images. The robust correspondence between the adjacent images may be determined by matching such common features in the overlapping fields of view of the adjacent images. However, quality of the combined image may be affected by the number of matched features, the distribution of the matched features, and/or the amount of overlapping portion between the adjacent images.

In some embodiments, two adjacent images may not have sufficient common features that may be identified and matched in order to determine a correspondence between the two adjacent images. In such embodiments, parameters output from an imaging device that associate with each of the adjacent images may be utilized to determine a correspondence between the adjacent images.

In an embodiment, a self-calibration algorithm may be implemented to determine correspondence between two images. Self-calibration algorithm is widely used in the art of computer vision for calibrating parameters of an imaging device. For instance, assuming that a first image corresponds to a second image based on a mapping matrix H. The mapping matrix H may be obtained by implementing the foregoing embodiments, such as processes 500 and 505. A rotational matrix R that represents a rotational relationship between the first image and the second image may be output from the imaging device based on data collected from the motion sensors integrated in the imaging device. The self-calibration algorithm may be applied to determine intrinsic matrices of the imaging device that are associated with the first and second images. The calculation may be conducted according to the following expression:

$$H = K_1^{-1} R K_2, \qquad \text{Eq. (1)}$$

where $K_1$ is a first intrinsic matrix of the imaging device associated with a first image, $K_2$ is a second intrinsic matrix of the imaging device associated with the second image. The rotational matrix R is an orthogonal matrix and detR=1. As widely used in the art, an intrinsic matrix of an imaging device may be a 3×3 matrix, which may include focal length and coordinates of the optical center of the imaging device. The optical center may be defined as the center of an image. Thus, the coordinates of the optical center may be obtained from the image. The focal lengths of the imaging device, as the only unknown variables in Eq. (1), may be determined according to the relationship expressed by Eq. (1).

On the other hand, when the rotational matrix R and the intrinsic matrices $K_1$ and $K_2$ for two images are known, the mapping matrix H may be determined according to Eq. (1).

Figure 6:
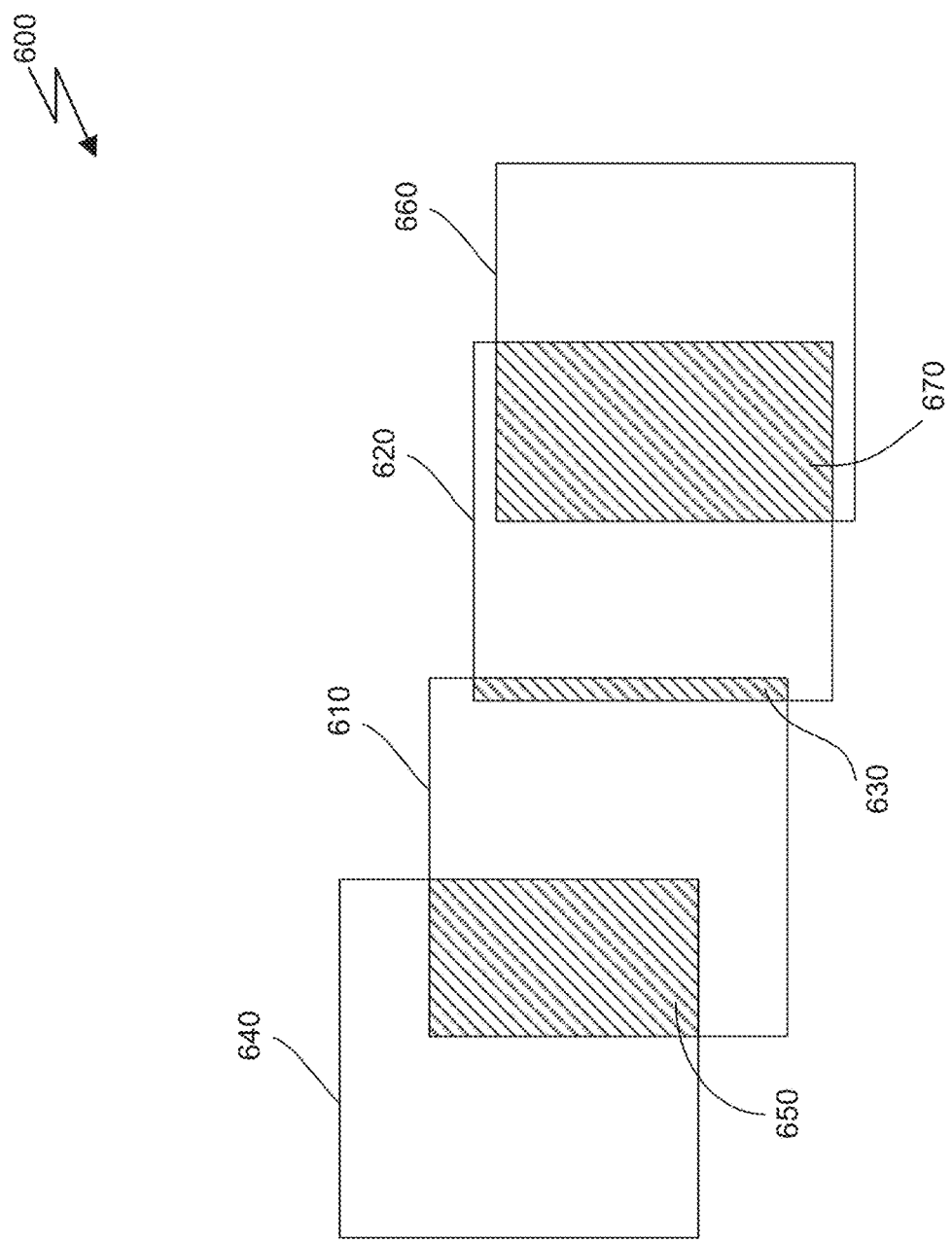
FIG. 6 illustrates four images that are used for determining correspondence between a first image and a second image.

FIG. 6 illustrates an embodiment 600 of four images that are used for determining correspondence between a first image 610 and a second image 620. The process of determining correspondence between first image 610 and second image 620 may be implemented by device 200 according to the computer-executable instructions stored in memory 230. Of course, it will be appreciated that any system or device capable of carrying out the steps of the process is contemplated as being within the scope of the present disclosure.

First image 610 and second image 620 may have an overlapping portion 630. Overlapping portion 630 may not provide sufficient matching features for generating a robust correspondence between first image 610 and second image 620. In such case, the correspondence between first image 610 and second image 620 may be determined based on Eq. (1).

A first intrinsic matrix $K_1$ may be determined based on first image 610 and a third image 640. First image 610 and third image 640 have an overlapping portion 650. Since overlapping portion 650 contains sufficient features for implementing above-mentioned feature matching processes, a target mapping matrix $H_{13}$ between first image 610 and third image 640 may be determined. A rotational matrix $R_{13}$ may be determined by comparing rotation matrices $R_1$ and $R_3$ that are output from the imaging device and associated with first image 610 and third image 640 respectively. By applying Eq. (1), first intrinsic matrix $K_1$ and a third intrinsic matrix $K_3$ may be obtained.

Similarly, a second intrinsic matrix $K_2$ may be determined based on second image 620 and a fourth image 660, which have an overlapping portion 670.

A rotational matrix $R_{12}$ between first image 610 and second image 620 may be determined by comparing rotation matrices $R_1$ and $R_2$ that are output from the imaging device and associated with first image 610 and second image 620 respectively.

By applying the obtained $K_1$, $K_2$ and $R_{12}$ to Eq. (1), a mapping matrix $H_{12}$ between first image 610 and second image 620 may be determined. As such, a robust correspondence between first image 610 and second image 620 may be established.

In some embodiment, an intrinsic matrix associated with an image may be determined by obtaining an effective focal length. Such effective focal length may be determined based on exchangeable image file format (Exif) of the image. Exif is a standard that specifies the formats for images. As known in the art, the effective focal length F may be derived from Exif, and thereafter the focal length f in the intrinsic matrix may be calculated by the following expression, $$f = \frac{\max(img.cols, img.rows) \times F(\text{mm})}{35(\text{mm})} \quad \text{Eq. (2)}$$

When there are no correspondence between any pair of adjacent images able to be found, an approximated focal length may be used to estimate the intrinsic matrix thus obtaining an estimated mapping matrix between adjacent images.

Figure 7:
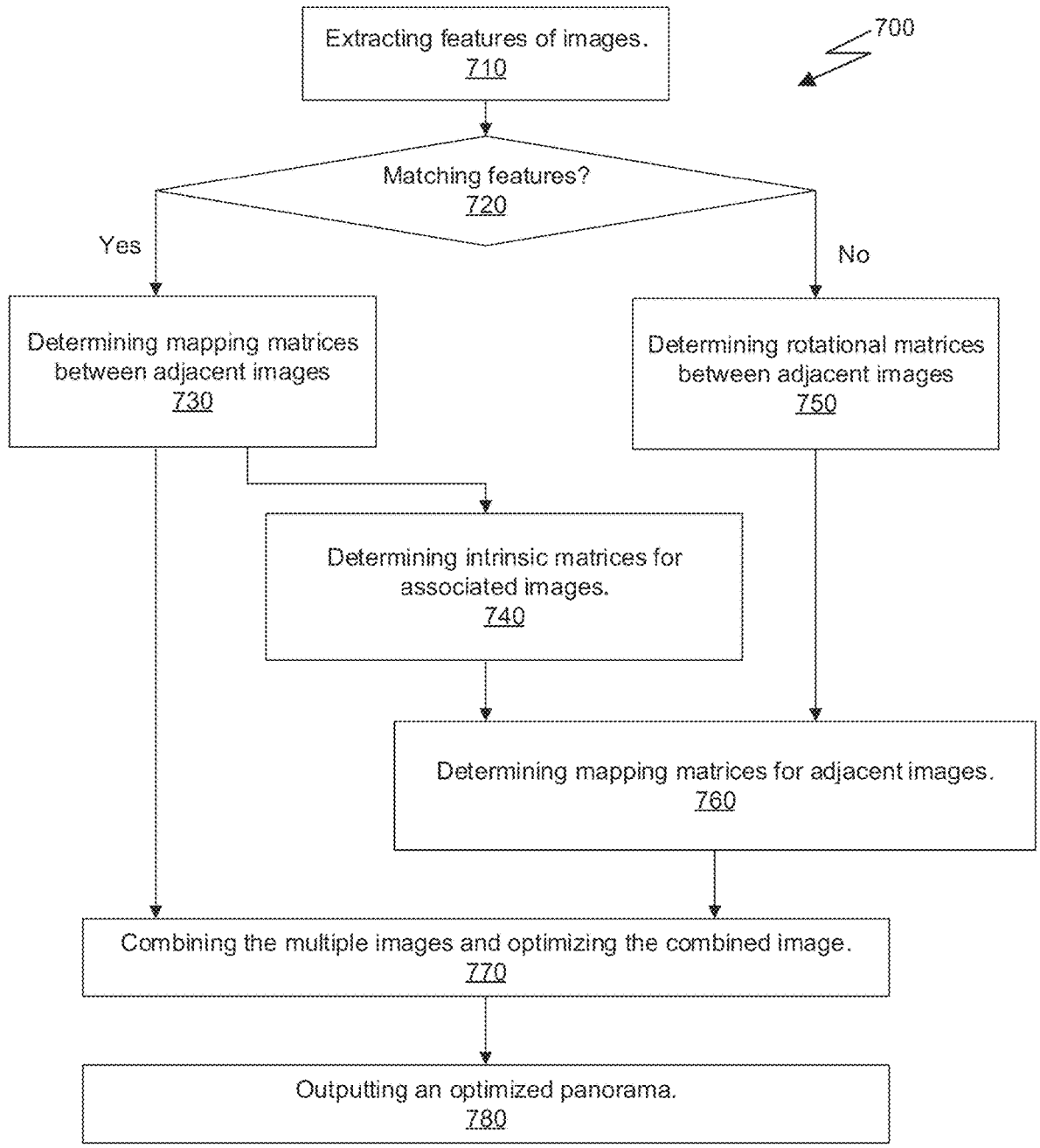
FIG. 7 illustrates a process of combining multiple images acquired by an imaging device for a 3D space.

FIG. 7 illustrates a process 700 of combining multiple images acquired by an imaging device for a 3D space. Adjacent images may or may not have overlapping fields of view. Process 700 may also be implemented by device 200 according to the computer-executable instructions stored in memory 230. Of course, it will be appreciated that any system or device capable of carrying out the steps of process 700 is contemplated as being within the scope of the present disclosure.

The imaging device may have one or more augmented reality (AR) applications stored thereon, such as ARKIT in an iPhone operation system (iOS) or ARCORE in an ANDROID system. The AR applications may collect data from motion sensors integrated in the imaging device and generate a parameter matrix based on the collected data of the motion sensors. The parameter matrix may be a 3×4 matrix output from the motion sensor, which may include a 3×3 rotation matrix and a translation vector as known in the art. The parameter matrix may be used to define the position of the optical center of the imaging device in a coordinate system. Each image acquired by the imaging device may be associated with a parameter matrix. In some embodiment, parameter matrices that are associated with multiple images may be used to determine correspondences among the multiple images. Such that the multiple images may be combined based on the determined correspondences.

At step 710, features may be extracted for adjacent images.

At step 720, the extracted features for the adjacent images may be compared. When there are sufficient matching features between adjacent images, a mapping matrix between each pair of adjacent images may be determined at step 730. The mapping matrices may be determined by implementing aforementioned processes, such processes 500 and 505.

At step 740, intrinsic mapping matrices for the adjacent images may be determined based on the mapping matrix between the adjacent images.

At step 750, for a pair of adjacent images that don't have sufficient matching features, a rotational matrix between the adjacent images may be determined.

At step 760, a mapping matrix for the adjacent images that don't have sufficient matching features may be determined based on the intrinsic matrices obtained at step 740 and the rotational matrix obtained at step 750.

At step 770, the multiple images may be combined and optimized.

In an embodiment, output parameter matrices for each of the multiple images may be used to optimize the combined image by adjusting tilting angle of the imaging device. Tilting angle of an imaging device may be defined as an angle between a normal vector to a horizontal plane and a normal vector to the base plane of the imaging device. The imaging device may be tilted at different angles while acquiring different images. As such, each image acquired by the imaging device associates with a tilting angle, which may be represented by a vector normal to the base plane of the imaging device in a coordinate system. Without adjusting such tilting angle differences, the resulting combined image may suffer from distortion. The tilting angles of the imaging device may be adjusted based on parameter matrices associated with the multiple images.

Figure 8:
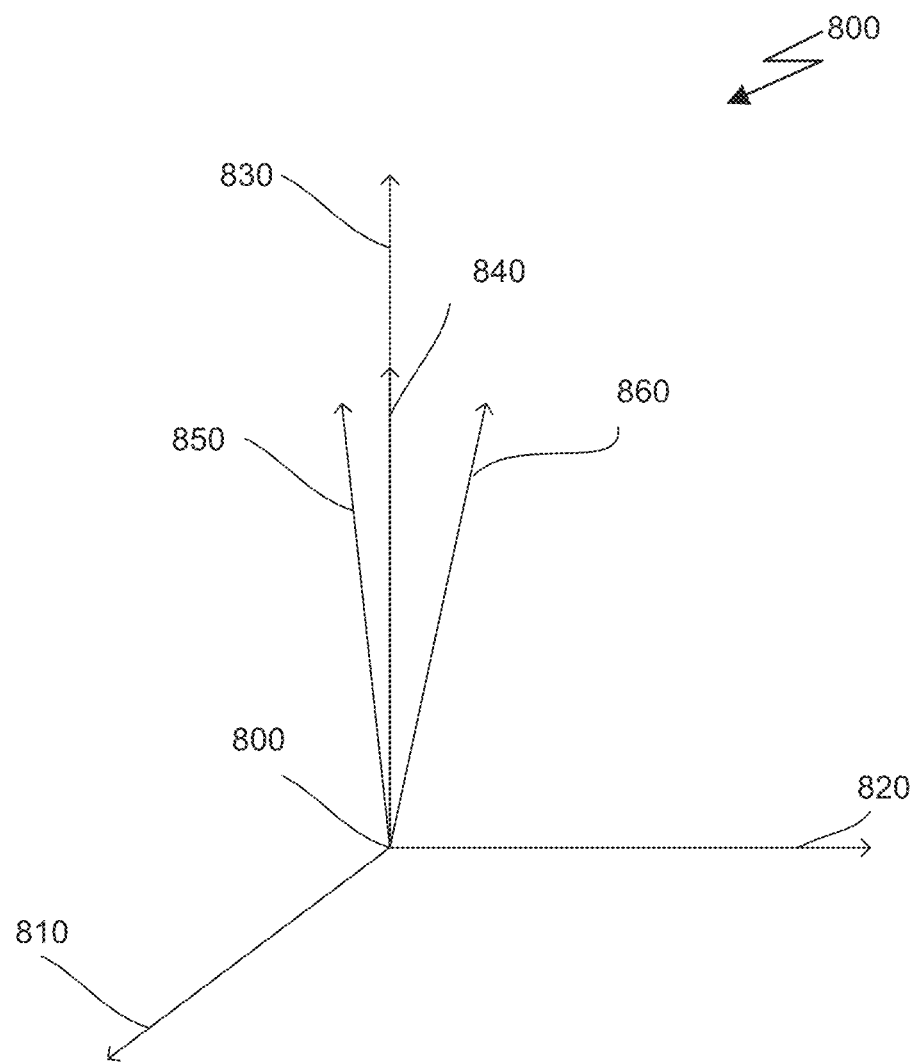
FIG. 8 illustrates multiple vectors representing different tilting angles associated with multiple images.

FIG. 8 illustrates an example 800 of multiple vectors representing different tilting angles associated with multiple images. A global coordinate system may be defined as the coordinate system of the first acquired image. Assuming that the first image is acquired when the imaging device is leveled. In other words, the tilting angle of the imaging device is 0 with respect to the normal vector to the horizontal plane. The optical center of the first image may be defined as origin 800 of the global coordinate system. The global coordinate system includes an x-axis 810, a y-axis 830 and a z-axis 820. In some embodiments, the optical center of the imaging device may be fixed during the image acquisition process. Thus, all the obtained vectors associated with the multiple images may be placed at origin 800. Since the global coordinate system is defined by the coordinate system of the first image, a vector 840 associated with the first image is parallel to y-axis 830. A vector 850 associated with a second image may be calculated based on parameter matrices associated with the first image and the second image. Each parameter matrix includes a 3×3 rotation matrix and a translation vector as known in the art. Vector 850 associated with the second image may be calculated based on the rotation matrix of the first image and the rotation matrix of the second image. Similarly, vector 860 associated with a third image may be calculated based on the rotation matrix of the first image and a rotation matrix of the third image. As such, vectors associated with the multiple images may be calculated and plotted in the global coordinate system. Subsequently, the mapping matrices obtained by steps 730 and 760 may be adjusted based on the obtained vectors. Therefore, the correspondences between adjacent images may be optimized.

In a further embodiment, the multiple images may be a sequence of images acquired by rotating the imaging device by 360 degrees along a horizontal direction. The number of images may be denoted as N, N is an integer. As a result, the number of correspondences obtained for each adjacent image pairs is N. The $i^{th}$ correspondence may be defined as a correspondence between $i^{th}$ image and $(i+1)^{th}$ image where i is an integer less than or equal to N. The $(N+1)^{th}$ image is actually the first image. Thus, the $N^{th}$ correspondence is a correspondence between two first images. Only N−1 number of correspondences may be required for combining the N number of images. The $N^{th}$ correspondence, however, may be utilized to optimize the combined image.

In an embodiment, the combining process may be conducted by combining the $2^{nd}$ image to the $1^{st}$ image to generated a composite image, then combining the $3^{rd}$ image to the composite image, . . . , until the $N^{th}$ image being combined to the composite image. As such an initial panorama may be generated. The next step is to combine the first image to the first image based on the $N^{th}$ correspondence between the two $1^{st}$ images. Ideally, the two first images should be an exact overlap. In real case, the process of combining adjacent images may cause deviations, thus resulting an accumulation of deviations due to the $N^{th}$ combination processes. As a result, the two $1^{st}$ images may not be an exact overlap after the $N^{th}$ combination process. The shift between the two $1^{st}$ images may be calculated and utilized to adjust the obtained correspondences (e.g., mapping matrices) between adjacent images. Such that the initial panorama may be optimized thus ensuring high-quality of the generated panorama.

Referring back to FIG. 7, at step 780, an optimized panorama generated by step 760 may be output for use of 3D VR applications.

In a still further embodiment, although the above-mentioned optimization process may be applied to the generated panorama, the generated panorama may still contain at least one ghost image. A ghost image is a defect in a combined image, which is commonly regarded as a type of flare. Such ghost image may be eliminated by applying a trained neural network.

The neural network may be trained by a plurality of training data sets. Each training data set may include a first training image that does not include a ghost image, and a corresponding second training image that includes at least one ghost image. The second training image may be a copy of the first image imparted with at least one ghost image. Each of the first training images and the second training images may be a panorama of a 3D space. Each image may have a size of 640×320 pixels. Of course, training images may not be panoramas and other sizes of the images may be utilized. The type and size of the images should not be limited in this disclosure.

The plurality of training data sets may be used to train the neural network, so that a trained model for eliminating ghost images may be obtained.

In some embodiments, when the size of the training images of the training data sets are all defined as 640×320 pixels, the neural network may be configured to receive images of a size of 640×320 pixels. As such, when the neural network receives an image to process, the neural network may determine whether the size of the received image is 640×320 pixels. If the size of the received image is 640×320 pixels, the neural network will process the received image and output an image in which the at least one ghost image may be removed. If the size of the received image is not 640×320 pixels, for instance 1280×640 pixels, the received image may be resampled to generate an image of 640×320 pixels. Subsequently, the generated image of for instance 640×320 pixels may be process by the neural network to remove ghost images. In such embodiment, the neural network may output processed images of 640×320 pixels.

In some embodiments, a training image that includes at least one ghost images may be generated based on a training image that does not include ghost images.

Figure 9A:
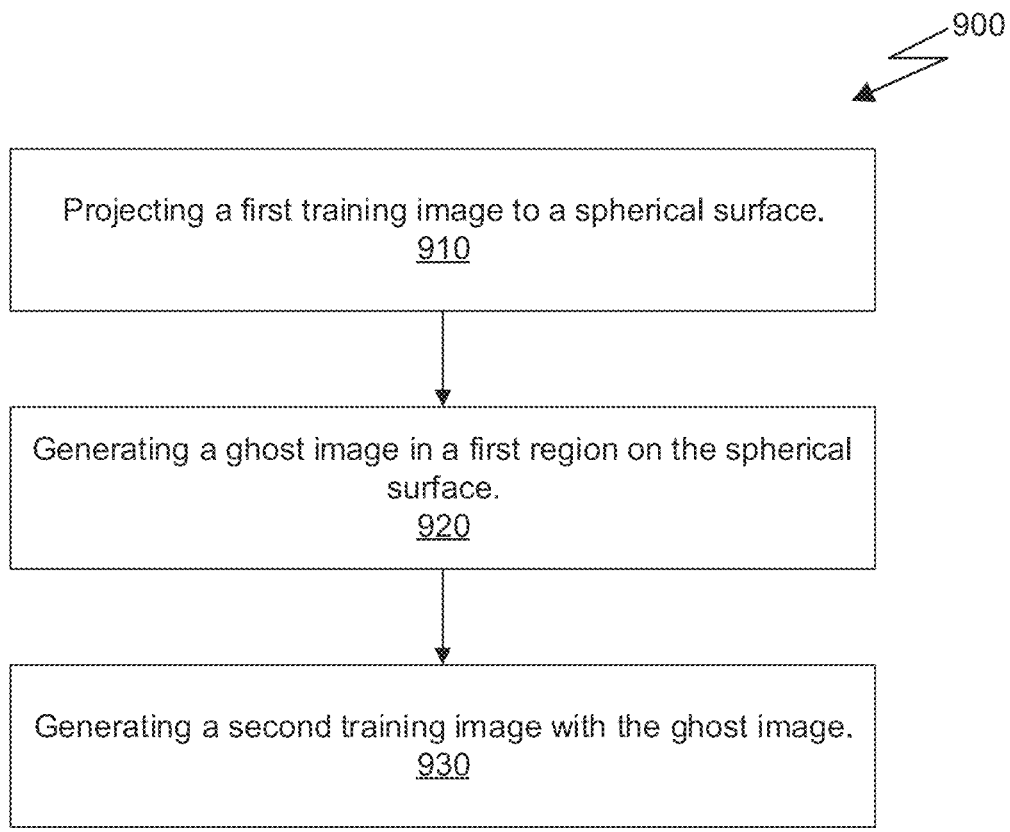
FIG. 9A illustrates a process of generating a training image that includes a ghost image in accordance with an embodiment.

FIG. 9A illustrates a process 900 of generating a training image that includes a ghost image in accordance with an embodiment. Process 900 may also be implemented by device 200 according to the computer-executable instructions stored in memory 230. Of course, it will be appreciated that any system or device capable of carrying out the steps of process 900 is contemplated as being within the scope of the present disclosure.

The training image that includes a ghost image may be generated based on a corresponding training image that does not include ghost images. Each of the training images may be a panorama. The panorama may be generated based on a plurality of images of a scene by implementing process 700 as illustrated in FIG. 7.

At step 910, a first training image may be projected to a spherical surface. The first training image does not include ghost images.

At step 920, a ghost image may be generated in a first region on the spherical surface. The first region on the spherical surface may be randomly selected. The size of the first region may be predefined as the size of an image acquired by an imaging device. A second region may be generated by applying a small disturbance to the first region. The second region may have an identical size of the first region. The disturbance may be applied according to a normal distribution, which is equivalent to a certain amount of rotation and/or displacement applied to the first region. Subsequently, a duplicated image of the second region, that is the ghost image, may be imparted to the first region. Transparency of the first region and the duplicated image of the second region may be adjusted. As such, a ghost image may be visible in the first region on the spherical surface. Similarly, a number of ghost images may be generated on the spherical surface.

At step 930, a second training image may be generated based on the spherical surface with the ghost image. The spherical surface may be converted to a panorama, and the resulting image may be used as the second training image.

Figure 9B:
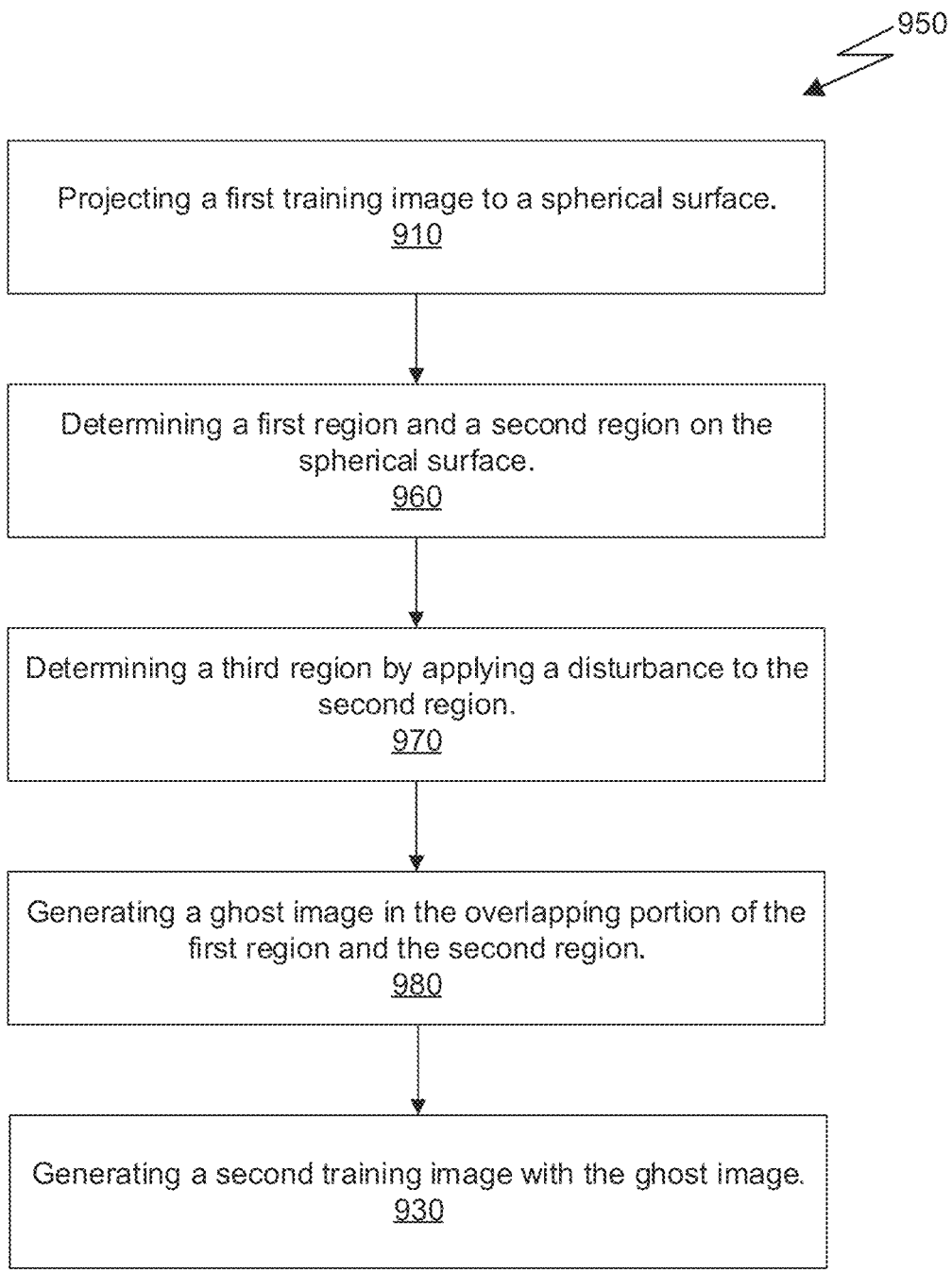
FIG. 9B illustrates a process of generating a training image that includes a ghost image in accordance with a further embodiment.

FIG. 9B illustrates a process 950 of generating a training image that includes a ghost image in accordance with a further embodiment. Process 950 may also be implemented by device 200 according to the computer-executable instructions stored in memory 230. Of course, it will be appreciated that any system or device capable of carrying out the steps of process 950 is contemplated as being within the scope of the present disclosure.

At step 910, a first training image may be projected to a spherical surface. The first training image does not include ghost images.

At step 960, a first region and a second region may be selected on the spherical surface. The first region may be randomly selected on the spherical surface. The size of the first region may be the size of images acquired by an imaging device. The second region of the same size of the first region may be selected in such a way that the second region and the first region may simulate two adjacent images acquired by an imaging device. In an embodiment, the first region and the second region may have an overlapping portion.

At step 970, a third region may be determined by applying a disturbance to the second region. Similar process in step 920 of process 900 may be applied to this step. As a result, a ghost image may be generated by duplicating the image of the third region.

At step 980, a ghost image may be generated in the overlapping portion of the first region and the second region. The ghost image generated in the previous step may be imparted to the second region on the spherical surface. In real case, ghost images typically occur in the overlapping area between adjacent images during combination process. In order to simulate such case, the transparency of the generated ghost image and the first region may be adjusted at the overlapping portion between the first region and the second region. Such that the ghost image may be visible in the overlapping portion of the first region and the second region.

By repeating steps 960 through 980, a number of ghost images may be generated on the spherical surface.

In a further embodiment, the boundaries of the overlapping portion between the first region and the second region may be smoothed by applying filtering, such as mean filtering, median filtering, etc. As such, a second spherical surface may be obtained after applying the filtering process.

At step 930, a second training image may be generated based on the spherical surface with the ghost image. Alternatively, the second training image may be generated based on the second spherical surface generated at step 980. The spherical surface may be converted to a panorama, thus obtaining a second training image.

A large amount of training data sets may be generated by implementing processes 900 or 950. Subsequently, the training data sets may be fed to a neural network to obtain a trained model. Output of the neural network may be an image removed with the at least one ghost image, and optionally an indication mask to indicate position of each ghost image in the corresponding image. The indication mask may be obtained by comparing the first training image that does not include ghost images and the corresponding second training image that includes at least one ghost image.

Figure 10:
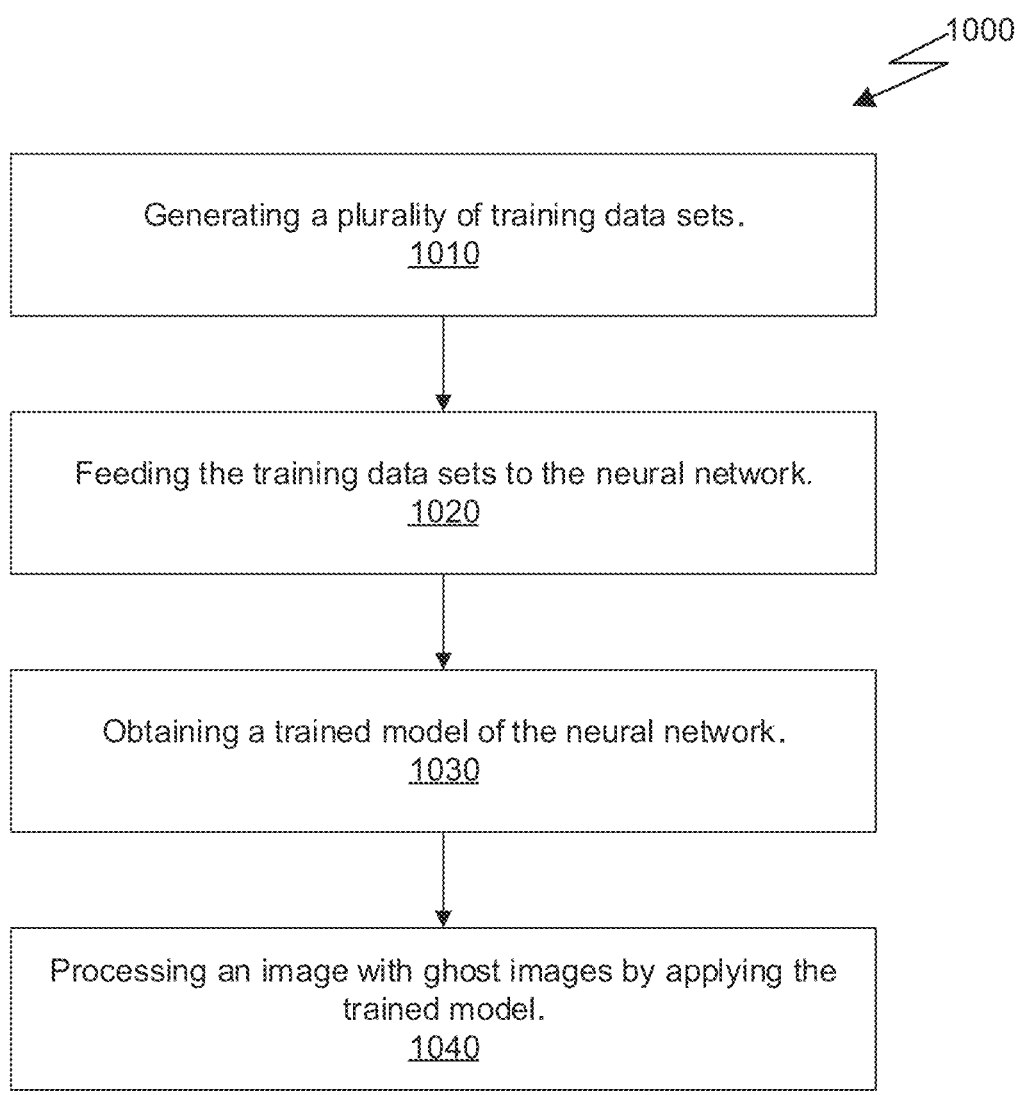
FIG. 10 illustrates a process of training a neural network to remove ghost images in accordance with an embodiment.

FIG. 10 illustrates a process 1000 of training a neural network to remove ghost images in accordance with some embodiments. Process 1000 may also be implemented by device 200 according to the computer-executable instructions stored in memory 230. Of course, it will be appreciated that any system or device capable of carrying out the steps of process 1000 is contemplated as being within the scope of the present disclosure.

At step 1010, a plurality of training data sets may be generated. Each training data set may include a first training image without ghost images and a corresponding second training image with ghost images. The second training image may be generated based on the first training image by implementing processes 900 or 950.

At step 1020, the generated training data sets may be fed to a neural network.

In an embodiment, the neural network may have an Encoder-Decoder structure. The Encoder part may include a dense convolutional network (DenseNet) for extracting features. As widely used in the art, the feature dimension of the DenseNet may be num_channels×20×10. Optionally, num_channels may be 512. An input image size may be 640×320 pixels. As such 20×10 indicates 5 times downscaling applied to the input image, where width and height of the input image are divided by 2 for each downscaling process. The Decoder part may include two convolutional layers followed by 5 unsampling layers and one more convolutional layer. Such that, the Decoder may restore the image to the size of 640×320 pixels. In some embodiments, the neural network may output two channels based on forward population. One channel may be a 640×320 image removed with the at least one ghost image. The other channel may be a 640×320 ghost image indication mask that indicates location information of each ghost image.

At step 1030, training the neural network may result in a trained model.

At step 1040, the trained model may be utilized to process input images with at least one ghost image. The output of the trained model may include an image removed with the at least one ghost image and optionally an indication mask to indicate position of each ghost image in the corresponding image.

Figure 11:
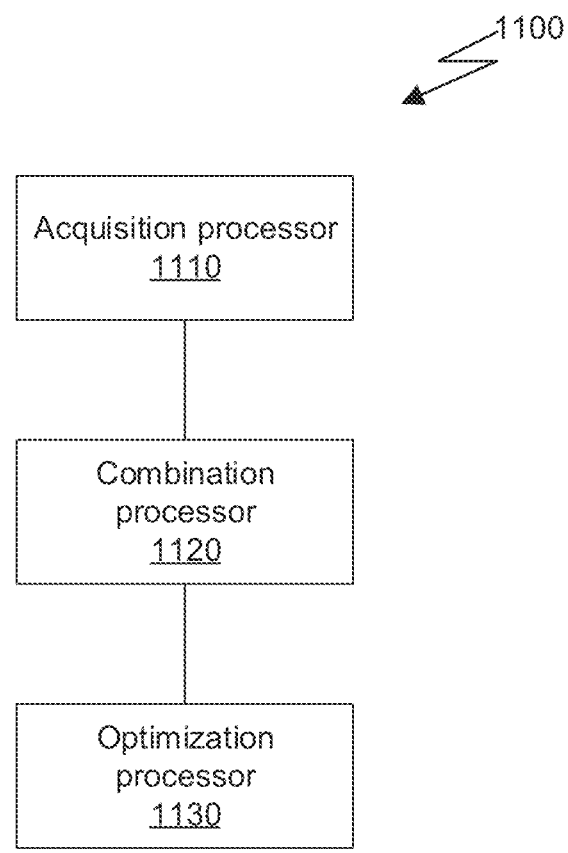
FIG. 11 illustrates an electronic device to implement image combination in accordance with an embodiment.

The foregoing disclosed processes may also be carried on by an electronic device 1100 as illustrated in FIG. 11 in accordance with an embodiment. Device 1100 may comprise an acquisition processor 1110, a combination processor 1120, and an optimization processor 1130, which may be implemented by computer-executable instructions stored in, for example, memory 230 and executed by processor 210 described above with respect to FIG. 2.

Acquisition processor 1110 may be configured to collect a plurality of images of a 3D space. In some embodiments, the plurality of images may be acquired by rotating an imaging device by 360 degrees along a horizontal direction. Adjacent images may or may not have overlapping fields of view.

Combination processor 1120 may be configured to combine the plurality of images collected by acquisition processor 1110. Combination of the images may be based on correspondences determined among the plurality of images. Aforementioned processes such as processes 500, 505 or 700 may be implemented to obtain target mapping matrices between adjacent images thus establishing the correspondence between the adjacent images.

Optimization processor 1130 may be used to optimize the combined image generated by combination processor 1120. Optimization processes may include adjusting tilting angles associated with each collected image, adjusting mapping matrices and removing ghost images.

After optimization process, a high-quality composite image by combining the plurality of images may be generated for use of 3D VR applications.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A method for combining multiple images, comprising:
   determining an initial mapping matrix based on matching features between a first image and a second image, wherein the initial mapping matrix is associated with an initial correspondence between the first image and the second image;
   mapping the first image to an image space of the second image based on the initial mapping matrix;
   determining a region of interest (ROI) based on an overlapping potion of the mapped first image and the second image, wherein the overlapping portion is determined based on the first image, the second image, and the initial mapping matrix;
   determining a first set of corner points in the ROI of the first image;
   determining a second set of corner points in the second image based on the first set of corner points in the first image, wherein each corner point in the second set of the corner points corresponds to a corner point in the first set of the corner points;
   determining a third set of corner points in the first image based on the second set of corner points in the second image, wherein each corner point in the third second set of corner points corresponds to a corner point in the second set of corner points and corresponds to a corner point in the first set of corner points;
   calculating a plurality of second distances, wherein each of the plurality of second distances corresponds to a distance between the corner point of the first set of corner points and the corresponding corner point of the third set of corner points;
   selecting, based on the plurality of second distances, a fourth set of corner points from the first set of corner points in the first image, wherein the second distance between each corner point of the fourth set of corner points and the corresponding corner point of the first set of corner points is less than a threshold;
   determining a first target mapping matrix based on the overlapping portion between the first image and the second image, wherein the first target mapping matrix is associated with a target correspondence between the first image and the second image, and wherein determining the first target mapping matrix is further based on the fourth set of corner points and the second set of corner points;
   combining the first image and the second image into a combined image based on the first target mapping matrix; and
   outputting the combined image.

2. The method according to claim 1, further comprising:
   determining a first set of feature points in the first image; and
   determining a second set of feature points in the second image, each feature point of a subset of the second set of feature points corresponding to one of the first set of feature points,
   wherein determining the initial mapping matrix is further based on the feature points of the subset of the second set of feature points and the corresponding feature points in the first set of feature points.

3. The method according to claim 2, further comprising:
   determining a descriptor for each feature point of the first set of feature points and for each feature point of the second set of feature points;
   calculating a plurality of first distances, wherein each of the plurality of first distances corresponds to a distance between the descriptor of each of the first set of feature points and the descriptor of each of the second set of feature points; and
   selecting, based on the plurality of first distances, matching pairs from the first set of feature points and the second set of feature points, wherein each of the matching pairs includes a first feature point selected from the first set of feature points and a second feature point selected from the second set of feature points corresponding to the first feature point, and wherein determining the initial mapping matrix is further based on the matching pairs.

4. The method of according to claim 3, wherein the first distance between the descriptor of the first feature point and the descriptor of the second feature point is less than 128 pixels.

5. The method according to claim 1, wherein the combined image of the first image and the second image comprises a ghost image, wherein the ghost image is a defect within the combined image, and the method further comprising:

eliminating the ghost image from the combined image based on applying a neural network to the combined image.

6. The method according to claim 5, further comprising:

generating a plurality of training sets, each training set comprising a first training image and a second training image, wherein the second training image comprises a copy of the first training image imparted with at least one ghost image; and training the neural network by using the plurality of training sets.

7. The method according to claim 6, wherein the first training image in each training set is a panorama, the method further comprising:

projecting the first training image to a spherical surface corresponding to the panorama;

determining a first region on the spherical surface, wherein the size of the first region is the same as the size of an image acquired by the imaging device;

determining a second region on the spherical surface, wherein the second region is of the same size as the first region, and wherein the second region and the first region have an overlapping portion;

determining a third region by applying a random disturbance to the location of the second region;

obtaining an image of the third region in the first training image; and generating the second training image by imparting the image of the third region to the second region of the first training image, wherein the portion of the image of the third region at the overlapping portion is made transparent before the imparting.

8. The method according to claim 7, wherein the random disturbance is applied according to a normal distribution.

9. The method according to claim 6, wherein an output of the neural network comprises an indication mask indicating a position of each ghost image for the second training image.

10. A non-transitory computer-readable medium, having computer-executable instructions stored thereon, wherein the computer-executable instructions, when executed by one or more processors, cause a processor to facilitate:

determining an initial mapping matrix based on matching features between a first image and a second image, wherein the initial mapping matrix is associated with an initial correspondence between the first image and the second image;

mapping the first image to an image space of the second image based on the initial mapping matrix;

determining a region of interest (ROI) based on an overlapping potion of the mapped first image and the second image, wherein the overlapping portion is determined based on the first image, the second image, and the initial mapping matrix;

determining a first set of corner points in the ROI of the first image;

determining a second set of corner points in the second image based on the first set of corner points in the first image, wherein each corner point in the second set of the corner points corresponds to a corner point in the first set of the corner points;

determining a third set of corner points in the first image based on the second set of corner points in the second image, wherein each corner point in the third second set of corner points corresponds to a corner point in the second set of corner points and corresponds to a corner point in the first set of corner points;

calculating a plurality of second distances, wherein each of the plurality of second distances corresponds to a distance between the corner point of the first set of corner points and the corresponding corner point of the third set of corner points;

selecting, based on the plurality of second distances, a fourth set of corner points from the first set of corner points in the first image, wherein the second distance between each corner point of the fourth set of corner points and the corresponding corner point of the first set of corner points is less than a threshold;

determining a first target mapping matrix based on the overlapping portion between the first image and the second image, the first target mapping matrix associated with a target correspondence between the first image and the second image, and wherein determining the first target mapping matrix is further based on the fourth set of corner points and the second set of corner points;

combining the first image and the second image into a combined image based on the first target mapping matrix; and outputting the combined image.

11. A device for combining multiple images, comprising:

one or more processors; and a non-transitory computer-readable medium, having computer-executable instructions stored thereon wherein the computer-executable instructions, when executed by one or more processors, cause the one or more processors to facilitate:

obtaining a first image and a second image;

determining an initial mapping matrix based on matching features between the first image and the second image, wherein the initial mapping matrix is associated with an initial correspondence between the first image and the second image;

mapping the first image to an image space of the second image based on the initial mapping matrix;

determining a region of interest (ROI) based on an overlapping potion of the mapped first image and the second image, wherein the overlapping portion is determined based on the first image, the second image, and the initial mapping matrix;

determining a first set of corner points in the ROI of the first image;

determining a second set of corner points in the second image based on the first set of corner points in the first image, wherein each corner point in the second set of the corner points corresponds to a corner point in the first set of the corner points;

determining a third set of corner points in the first image based on the second set of corner points in the second image, wherein each corner point in the third second set of corner points corresponds to a corner point in the second set of corner points and corresponds to a corner point in the first set of corner points;

calculating a plurality of second distances, wherein each of the plurality of second distances corresponds to a distance between the corner point of the first set of corner points and the corresponding corner point of the third set of corner points;

selecting, based on the plurality of second distances, a fourth set of corner points from the first set of corner points in the first image, wherein the second distance between each corner point of the fourth set of corner points and the corresponding corner point of the first set of corner points is less than a threshold;

determining a first target mapping matrix based on the overlapping portion between the first image and the second image, wherein the first target mapping matrix is associated with a target correspondence between the first image and the second image, and wherein determining the first target mapping matrix is further based on the fourth set of corner points and the second set of corner points; and combining the first image and the second image into a combined image based on the first target mapping matrix.

12. The non-transitory computer-readable medium according to claim 10, wherein the computer-executable instructions, when executed by the one or more processors, cause the processor to further facilitate:

determining a first set of feature points in the first image; and determining a second set of feature points in the second image, each feature point of a subset of the second set of feature points corresponding to one of the first set of feature points, wherein determining the initial mapping matrix is further based on the feature points of the subset of the second set of feature points and the corresponding feature points in the first set of feature points.

13. The non-transitory computer-readable medium according to claim 12, wherein the computer-executable instructions, when executed by the one or more processors, cause the processor to further facilitate:

determining a descriptor for each feature point of the first set of feature points and for each feature point of the second set of feature points;

calculating a plurality of first distances, wherein each of the plurality of first distances corresponds to a distance between the descriptor of each of the first set of feature points and the descriptor of each of the second set of feature points; and selecting, based on the plurality of first distances, matching pairs from the first set of feature points and the second set of feature points, wherein each of the matching pairs includes a first feature point selected from the first set of feature points and a second feature point selected from the second set of feature points corresponding to the first feature point, and wherein determining the initial mapping matrix is further based on the matching pairs.

14. The non-transitory computer-readable medium according to claim 12, wherein the first distance between the descriptor of the first feature point and the descriptor of the second feature point is less than 128 pixels.

15. The non-transitory computer-readable medium according to claim 10, wherein the combined image of the first image and the second image comprises a ghost image, wherein the ghost image is a defect within the combined image, and wherein the computer-executable instructions, when executed by the one or more processors, cause the processor to further facilitate:

eliminating the ghost image from the combined image based on applying a neural network to the combined image.

16. The non-transitory computer-readable medium according to claim 15, wherein the computer-executable instructions, when executed by the one or more processors, cause the processor to further facilitate:

generating a plurality of training sets, each training set comprising a first training image and a second training image, wherein the second training image comprises a copy of the first training image imparted with at least one ghost image; and training the neural network by using the plurality of training sets.

17. The non-transitory computer-readable medium according to claim 16, wherein the first training image in each training set is a panorama, and wherein the computer-executable instructions, when executed by the one or more processors, cause the processor to further facilitate:

projecting the first training image to a spherical surface corresponding to the panorama;

determining a first region on the spherical surface, wherein the size of the first region is the same as the size of an image acquired by the imaging device;

determining a second region on the spherical surface, wherein the second region is of the same size as the first region, and wherein the second region and the first region have an overlapping portion;

determining a third region by applying a random disturbance to the location of the second region;

obtaining an image of the third region in the first training image; and generating the second training image by imparting the image of the third region to the second region of the first training image, wherein the portion of the image of the third region at the overlapping portion is made transparent before the imparting.

18. The non-transitory computer-readable medium according to claim 17, wherein the random disturbance is applied according to a normal distribution.

19. The non-transitory computer-readable medium according to claim 16, wherein an output of the neural network comprises an indication mask indicating a position of each ghost image for the second training image.

20. The device according to claim 11, wherein the computer-executable instructions, when executed by the one or more processors, cause the one or more processors to further facilitate:

determining a first set of feature points in the first image; and determining a second set of feature points in the second image, each feature point of a subset of the second set of feature points corresponding to one of the first set of feature points, wherein determining the initial mapping matrix is further based on the feature points of the subset of the second set of feature points and the corresponding feature points in the first set of feature points.

* * * * *